United States Patent [19]

Cattorini et al.

[11] 4,229,982

[45] Oct. 28, 1980

[54] CAM DRIVE SYSTEM HAVING PARALLEL INPUT AND OUTPUT SHAFTS

[75] Inventors: Joseph F. Cattorini, Palm Bay; Subhash R. Dandage, Rockledge, both of Fla.

[73] Assignee: Documation Incorporated, Melbourne, Fla.

[21] Appl. No.: 959,748

[22] Filed: Nov. 13, 1978

[51] Int. Cl.³ .................... F16H 21/12; F16H 21/48
[52] U.S. Cl. .................................. 74/63; 74/84 R; 74/112; 74/435; 74/436
[58] Field of Search ............. 74/84 R, 112, 435, 436, 74/816, 817, 820, 821, 827, 63

[56] References Cited

U.S. PATENT DOCUMENTS

| | | | |
|---|---|---|---|
| 2,986,949 | 6/1961 | Lancaster et al. | 74/84 |
| 3,170,333 | 2/1965 | Umbricht | 74/84 |
| 3,421,380 | 1/1969 | Mansour | 74/84 |
| 3,545,297 | 12/1970 | Mahn | 74/436 X |

FOREIGN PATENT DOCUMENTS 293904  8/1928  United Kingdom ............... 74/436

Primary Examiner—Lawrence J. Staab
Attorney, Agent, or Firm—Duckworth, Hobby, Allen & Pettis

[57] ABSTRACT

A cam drive system having parallel input and output shafts and means for rotating the input shaft includes a plurality of cams coupled at intervals around the periphery of the input shaft. Each cam utilizes a camming surface which incorporates a radially outwardly sweeping step section and a constant radius dwell section positioned adjacent to each step section. A plurality of cam followers are coupled at intervals around the periphery of the output shaft. Each cam follower is aligned to engage a single one of the cams. The present invention converts the continuous rotation of the input shaft into intermittant displacements of the output shaft.

18 Claims, 7 Drawing Figures

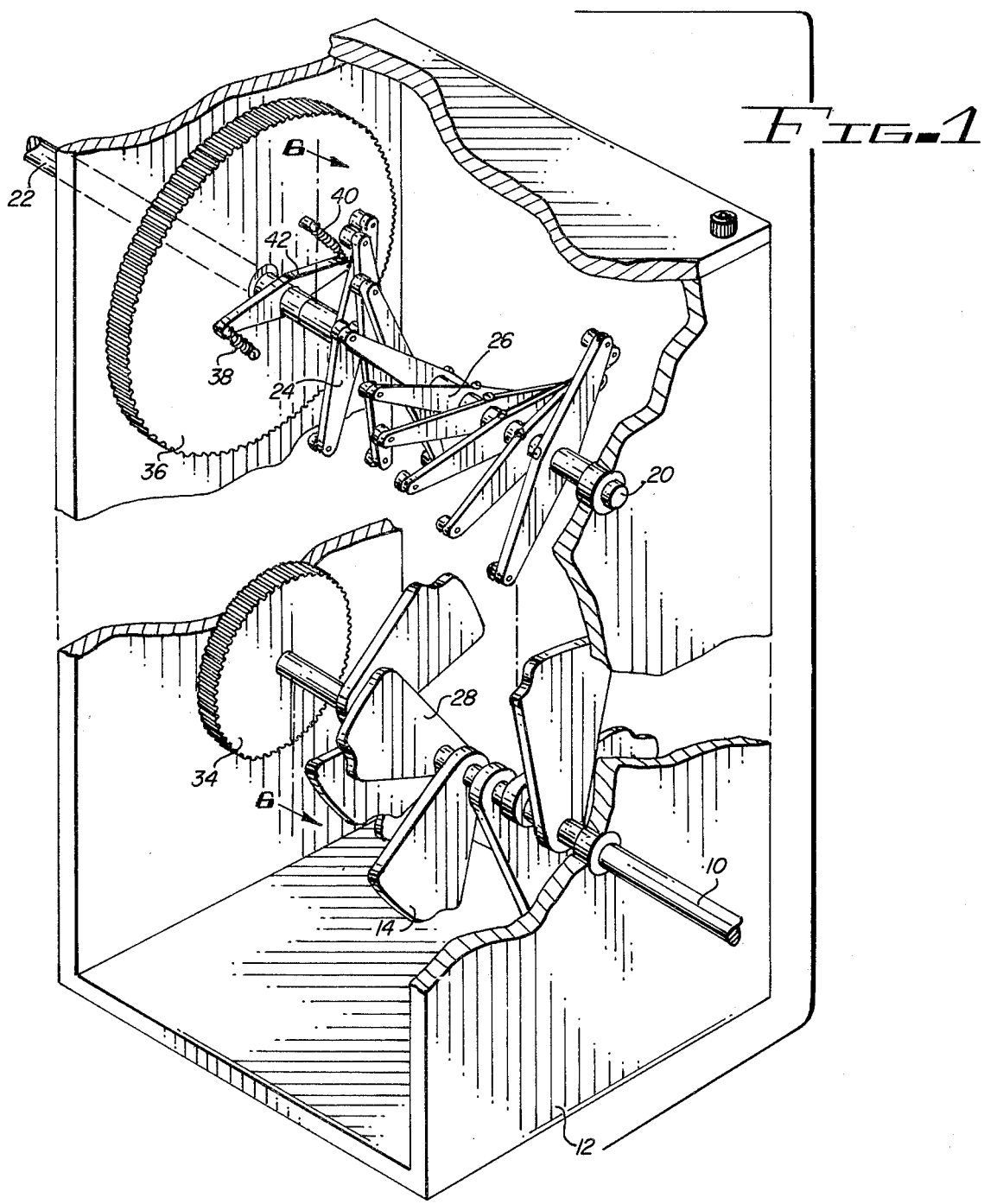

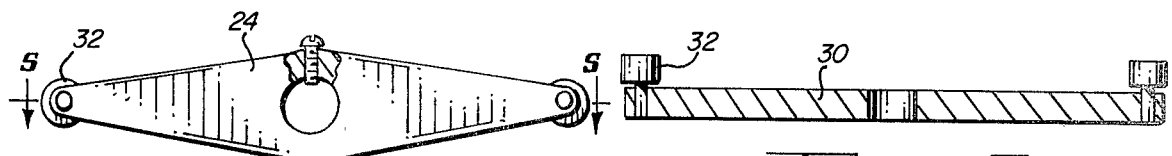
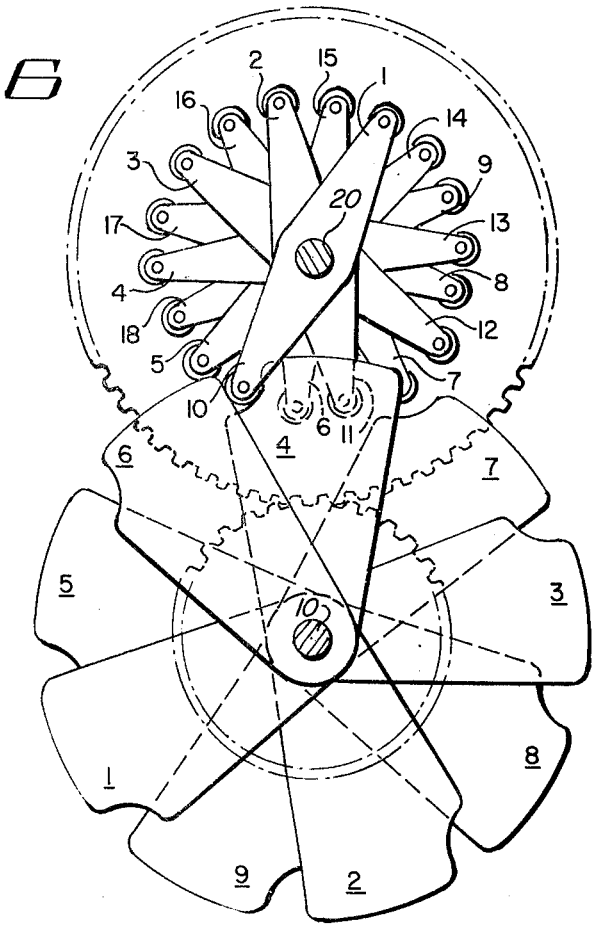
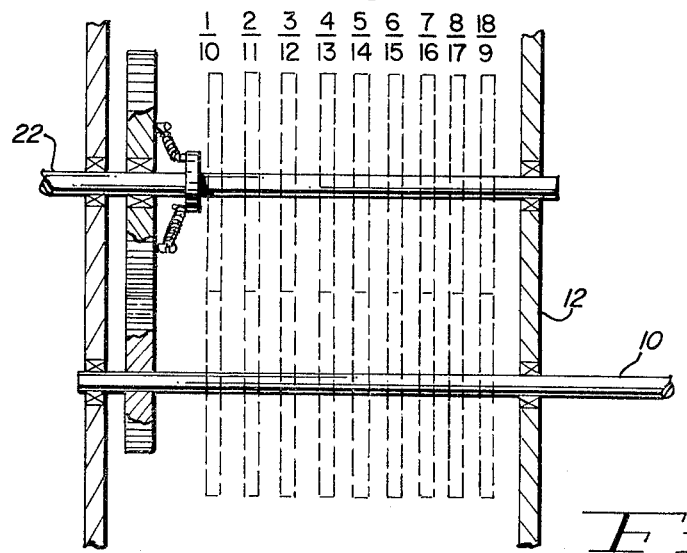

CAM DRIVE SYSTEM HAVING PARALLEL INPUT AND OUTPUT SHAFTS

BACKGROUND OF THE INVENTION

1. Field of the Invention

This invention relates to cam drive systems, and more particularly, to cam drive systems having parallel input and output shafts.

2. Description of the Prior Art

*Mechanisms In Intermittent Motions* by John H. Bickford (copyright 1972, pages 122-125, discloses parallel shaft intermittent motion machines having a cam and multiple-arm cam followers. U.S. Pat. No. 3,525,268 (Kenny) discloses a related parallel shaft cam drive mechanism.

U.S. Pat. Nos. 2,986,949 (Lancaster) and 3,170,333 (Unbircht) disclose additional parallel shaft cam drive mechanisms for converting a rotary input motion into a stepped output motion.

U.S. Pat. No. 3,650,157 (Spratheam) discloses a timer having a cam follower spring biased into contact with a cam. Other relative inventions are disclosed in the following U.S. Pat. Nos. 3,349,643 (Roundtree), 2,906,131 (Daugherty), 2,583,966 (Rhoads, et al.), Re. 26,979 (Petroff).

SUMMARY OF THE INVENTION

The present invention contemplates a cam drive system having parallel input and output shafts and means for rotating the input shaft. The system comprises a plurality of cams coupled at intervals around the periphery of the input shaft. Each cam incorporates a camming surface having a radially outwardly sweeping step section and a constant radius dwell section positioned adjacent to each step section. A plurality of cam followers are coupled at angular intervals about the periphery of the output shaft. Each cam follower is aligned to engage one or more cams. The present invention converts the continuous rotation of the input shaft into stepped angular displacements of the output shaft. Each displacement of the output shaft is followed by a dwell interval of a predetermined duration.

An important aspect of the present invention is the ability of the system to convert a relatively low input shaft rotation rate into substantially faster stepped angular displacements of the output shaft.

DESCRIPTION OF THE DRAWINGS

The invention is pointed out with particularity in the appended claims. However, other objects and advantages together with the operation of the invention, may be better understood by reference to the following detailed description taken in connection with the following illustrations wherein:

FIG. 1 is an exploded perspective view of a cam drive system of the present invention and illustrates the general configuration of a preferred embodiment. This figure does not accurately reflect the precise geometric structure of the invention.

FIG. 2 is a view from above of a cam utilized in the present invention.

FIG. 3 is an elevational view of the cam illustrated in FIG. 2.

FIG. 4 is a view from above of a cam follower utilized in the present invention.

FIG. 5 is a sectional view of the cam follower illustrated in FIG. 4, taken along section line 5—5.

FIG. 6 is an end view of the cams and cam followers illustrated in FIG. 1, taken along section line 6—6, which accurately illustrates the relative alignment of the cam followers with respect to the cams in a preferred embodiment of the present invention.

FIG. 7 is a view from above of the cam drive system illustrated in FIG. 1 showing by dotted lines the paths swept by the various cams and cam followers.

DESCRIPTION OF THE PREFERRED EMBODIMENT

In order to better illustrate the advantages of the invention and its contributions to the art, a preferred hardware embodiment of the invention will now be described in detail.

Referring now to FIG. 1, the cam drive system of the present invention includes an input shaft 10 which is driven at a constant angular velocity by rotating means such as an electric motor (not shown). Input shaft 10 is rotatably coupled to and suspended from a frame 12.

Referring now to FIGS. 1, 6 and 7, a plurality of geometrically identical cams, such as cam 14, are coupled in a full circle around the periphery of input shaft 10 at equal angular intervals. In the embodiment illustrated, a total of nine cams are coupled at 40° intervals along the length of input shaft 10.

Referring to FIGS. 2 and 3, each cam includes a radially outwardly sweeping step section indicated generally by reference number 16 and a constant radius dwell section adjacent each step section. The dwell section of a cam is indicated generally by reference number 18.

Referring once again to FIGS. 1, 6 and 7, an output shaft 20 is rotatably coupled to frame 12 and is aligned parallel with input shaft 10. The item to be driven by the cam drive system of the present invention is coupled to extension 22 of output shaft 20.

Referring also to FIGS. 4 and 5, a plurality of geometrically identical cam followers, such as cam follower 24, are coupled in diametrically opposed pairs at equal angular intervals around the periphery of output shaft 20. Each pair of cam followers is aligned to engage a single cam. As indicated in FIG. 1, cam follower 26 is aligned to be engaged by cam 28.

Each cam follower includes an arm 30 and a roller 32 which is designed to be smoothly and uniformly engaged by step section 16 and dwell section 18 of the selected cam which is aligned with each pair of arm/roller units.

The cam/cam follower configuration utilized in the preferred embodiment of the present invention includes nine paired cam/cam follower units which are configured so that a 40° rotation of input shaft 10 will produce a 20° stepped angular displacement of output shaft 20. The number of steps per revolution of the input shaft can be readily modified by altering the number of cams coupled to the input shaft or by using cam followers having an increased number of arms. The step and dwell intervals can be readily modified by redesigning the cam profile to produce the desired relationship.

FIGS. 6 and 7 clearly indicate the angular and axial positioning of the cams with respect to input shaft 10 and the angular and axial positioning of the cam followers with respect to output shaft 20. In the preferred embodiment of the invention, input shaft 10 rotates at approximately 250 rpm. The nine cams are positioned as shown to optimize the dynamic balance of the input shaft/cam system. For comparatively low rotation rates of input shaft 10, the angular and relative axial positioning of the nine cams upon input shaft 10 is relatively unimporatant. Alternatively each cam can be balanced by a adding a counter-balancing weight. Since the arms of each cam follower unit are coupled in diametrically opposed pairs, the dynamic balance of the output shaft-/cam follower system is essentially automatically maintained.

The number of steps per minute (S) of output shaft 20 is indicated by the following relationship:

S=N×cam shaft RPM, where N equals the number of cams coupled at equal angular intervals to input shaft 10.

Referring to FIG. 1, special biasing means provides a retrotorque on output shaft 20 in order to maintain a firm contact between the camming surfaces of each cam and its cam follower unit. This special biasing means includes pinion gear 34 which is rigidly coupled to input shaft 10 and larger diameter pinion gear 36 whcih is rotatably coupled about an end section of output shaft 20. A pair of springs 38 and 40 have one end which is rigidly coupled to a side surface of pinion gear 36 and a second end which is coupled to a bracket 42 which is rigidly coupled to output shaft 20. The diameter of pinion gear 36 is twice the diameter of pinion gear 34. Pinion gear 36 has eighty gear teeth while pinion gear 34 has forty gear teeth.

As a result of the design of the cam drive system of the present invention and the utilization of cam followers having diametrically opposed arms to engage each single cam, the average rotation rate of output shaft 20 will be one half the rotation rate of input shaft 10. As a result of the gear ratios between pinion gears 34 and 36, pinion gear 36 will rotate with an angular velocity equal to exactly one half of the rotation rate of input shaft 10. Since each step section 16 is fabricated within a relatively small portion of the camming surface of each cam, output shaft 20 will be rapidly stepped during the intial engagement of each cam follower arm with step section 16 of an aligned cam. The interaction between a cam and its matching cam follower causes rapid angular displacement of output shaft 20 as the step section of the cam engages the cam follower. Output shaft 20 then maintains a predetermined angular position during the dwell interval which follows each step interval. Output shaft 20 will thus be rotated ahead of the angular position of pinion gear 36 and springs 38 and 40 will be extended. The extension of springs 38 and 40 provides a reverse biasing force against further rotary motion of output shaft 20 and causes the roller of the particular cam follower which is being engaged by an aligned cam to be maintained in tight rolling contact against the camming surface.

Reverse stepping motion can be readily obtained by adding an additional set of reverse cams in which the relative positioning of the step section and dwell section is reversed with respect to those illustrated in FIG. 1. In order to reverse the rotational direction of output shaft 20, output shaft 20 must be displaced laterally to disengage the forward oriented cams from alignment with the cam followers and then to engage the reversing cam set with the cam followers on output shaft 20.

The present invention can be modified in numerous ways and may assume many different embodiments involving various combinations of cams and cam followers. It is possible to fabricate the present invention in a configuration in which each cam can be engaged by one, two or by any multiple number of cam follower arms. The primary advantage of using an even number of cam follower arms and specifically the diametrically opposed paired arms of the preferred embodiment is that a dynamic force balance of the various centrifugal forces is automotically achieved and undue stress is not imposed on the output shaft. In another embodiment, cam followers having single arms can be coupled along the length of the output shaft and function in combination with multiple cams paired with each single cam follower arm. In another embodiment, multiple cam shafts can be used in combination with a single cam follower shaft.

It will be apparent to those skilled in the art that the disclosed cam drive system may be modified in numerous other ways and may assume many embodiments other than the preferred forms specifically set out and described above. For example, the geometric configuration of the step sections of the cams can be modified as required to controllably accelerate and decelerate output shaft 20. The number and angular alignment of cams coupled to input shaft 10 can also be readily modified to produce different types of output motion of output shaft 20. Accordingly, it is intended by the appended claims to cover all such modifications of the invention which fall within the true spirit and scope of the invention.

We claim:

1. A cam drive system having parallel input and output shafts and means for rotating said input shaft, said system comprising:
   a. a plurality of geometrically identical cams coupled along the length of said input shaft at equal angular intervals, each said cam having a camming surface occupying an arc of less than one hundred eighty degrees and including
      i. a radially outwardly sweeping step section;
      ii. a constant radius dwell section adjacent said step section;
   b. a plurality of geometrically identical cam followers coupled in diametrically opposed pairs at equal angular intervals along the length of said output shaft, each pair of said followers being aligned to engage the entire camming surface of a single one of said cams; and
   c. biasing means coupled to said output shaft for continuously biasing said cam followers against the camming surfaces of said cams, whereby the continuous rotation of said input shaft is converted into stepped angular displacements of said output shaft, each stepped displacement of said output shaft being followed by a dwell interval of a predetermined duration.

2. The system of claim 1 wherein each stepped displacement of said output shaft is of a predetermined first duration and wherein each dwell interval is of a predetermined second duration.

3. The system of claim 1 wherein the angular interval between each of said cam followers is equal to one half of the angular interval between each of said cams.

4. The system of claim 1 wherein the peak angular velocity of said output shaft is substantially greater than the angular velocity of said input shaft.

5. The system of claim 1 wherein the angular velocity of said output shaft during each dwell interval is zero.

6. The system of claim 1 wherein each of said cam followers includes:
   a. an arm; and b. a roller coupled to the outer end of said arm for rotatably engaging the step section and dwell section of said cam aligned with said arm.

7. The system of claim 1 wherein the step section of each of said plurality of cams is configured to smoothly accelerate and decelerate said output shaft.

8. The system of claim 1 wherein said cams and said cam followers are coupled to said input shaft and to said output shaft in such a manner that only a single cam follower actively engages a single cam at any selected time.

9. The system of claim 1 wherein said biasing means includes:
   a. a first pinion gear rigidly coupled to said input shaft;
   b. a second pinion gear rotatably coupled to said output shaft and aligned with said first pinion gear; and
   c. a resilient member coupled to a point on said second gear and to a point on said output shaft.

10. The system of claim 9 wherein said resilient member includes a spring.

11. The system of claim 9 wherein said resilient member includes an elastic band.

12. The system of claim 9 wherein the diameter of said second pinion gear is twice the diameter of said first pinion gear.

13. The system of claim 8 further including:
   a. a plurality of geometrically identical reversing cams coupled around the periphery of said input shaft at equal angular intervals, each said cam having a camming surface occupying an arc of less than one hundred eighty degrees and including
      i. a radially outwardly sweeping step section;
      ii. a constant radius dwell section adjacent said step section; and
   b. means for axially displacing said output shaft with respect to said input shaft to disengage said cams from alignment with said cam followers and to engage the entire camming surface of said reversing cams with said cam followers whereby said output shaft is driven in a reverse direction when the rotational direction of said input shaft rotating means is reversed.

14. The system of claim 1 wherein the average angular velocity of said output shaft is equal to half the angular velocity of said input shaft.

15. The system of claim 1 wherein each of said cams includes variable position coupling means for coupling said cams at a desired angular and longitudinal position with respect to said input shaft.

16. The system of claim 15 wherein said variable position coupling means maintains said cam perpendicular to the longitudinal axis of said input shaft.

17. The system of claim 1 wherein each of said plurality of cam followers includes variable position coupling means for coupling said cam follower at selected longitudinal and angular positions with respect to said output shaft.

18. The system of claim 17 wherein said variable position coupling means maintains said cam follower perpendicular to the longitudinal axis of said output shaft.

* * * * *